April 18, 1939.   R. W. CRETEUR   2,155,357
ROOF PANEL DEVICE
Filed Sept. 30, 1938
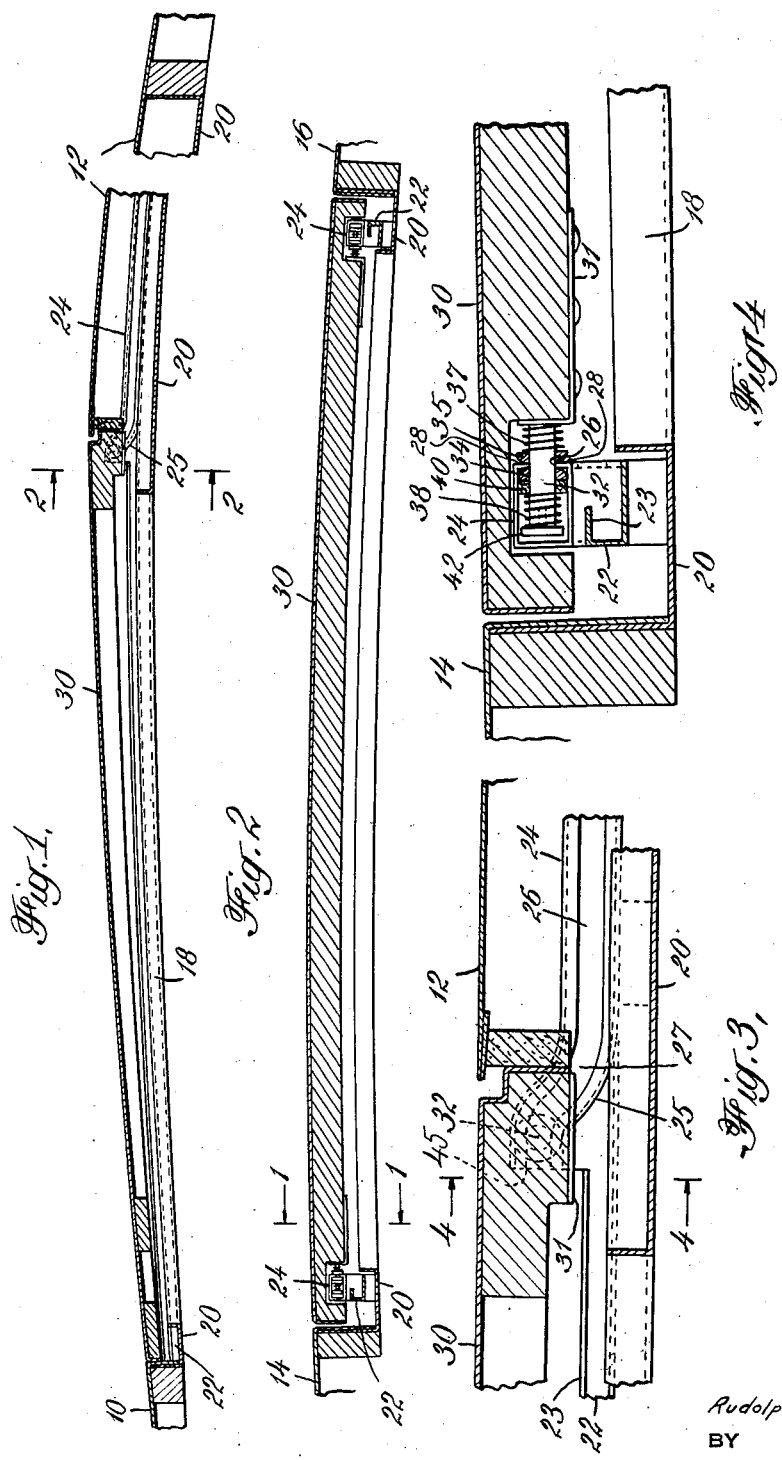
INVENTOR
Rudolph W. Creteur
BY
Pennie, Davis, Marvin & Edmonds
ATTORNEYS Patented Apr. 18, 1939

2,155,357

UNITED STATES PATENT OFFICE 2,155,357

ROOF PANEL DEVICE

Rudolph W. Creteur, Sunnyside, Long Island, N. Y., assignor to Sunair Auto Top Company, Inc., New York, N. Y., a corporation of New York Application September 30, 1938, Serial No. 232,605

5 Claims. (Cl. 296—137)

This invention relates to sliding roof panels for vehicle bodies and more particularly it relates to means by which such roof panels may be supported and guided.

In the construction of vehicle bodies having sliding roof panels, it is common to support the panels on longitudinal guides placed on either side of an opening in the vehicle roof. The panels themselves are provided at the front and rear with runners which move along the guides when the panel is moved to open or close the roof. It is difficult to install the longitudinal guides so that they are absolutely parallel, and since the guides and the cooperating runners serve to restrict the panel in its lateral movement, it will be apparent that any lack of parallelism in the guides will tend to cause rattling or binding of the panel depending upon whether the clearance between the runners and guides is too large or too small.

It is an object of this invention to provide a means for supporting and guiding sliding roof panels which automatically adjusts itself to any lack of parallelism in the longitudinal guides, whereby any tendency to bind or rattle may thus be eliminated.

It is a further object of the invention to provide such a self-compensating or self-adjusting means which is simple and inexpensive in construction, which is particularly easy to assemble, and which will permit the replacement of worn parts with a minimum of difficulty.

The invention will be illustrated by reference to the accompanying drawing in which Figure 1 is a longitudinal sectional view of a vehicle roof embodying the invention;

Figure 2 is a transverse sectional view of the roof panel taken along the line 2—2 of Fig. 1, looking in the direction indicated by the arrows;

Figure 3 is a sectional view along the line 1—1 of Fig. 2, looking in the direction indicated by the arrows; and Figure 4 is a sectional view along the line 4—4 of Fig. 3, looking in the direction indicated by the arrows.

In the drawing, 10 and 12 represent the front and rear portions, respectively, of a vehicle roof having side portions 14 and 16. The roof has a substantially rectangular opening 18 which is surrounded by a water-check tray 20. Spaced within the water-check tray along the sides of the roof opening and running substantially the entire length of the opening are channel members 22 having an inwardly directed flange 23. Beginning near the rear of the roof opening and extending under the rear portion 12 of the vehicle roof, are additional channel members 24. These members are positioned on opposite sides of the vehicle roof and curve upward at 25 where they may extend beyond the rear portion 12 of the vehicle roof. These channel members are provided with longitudinal slots 26 which curve upward at 27 where the channel members themselves are curved. Advantageously, the front channel members and the rear channel members are attached together by welding or other suitable means so that they may be placed in the vehicle roof as a single unit.

A substantially rectangular panel 30, adapted to close the roof opening 18, is provided at the front on each side with a runner such as that shown in Fig. 4 of Patent No. 2,007,865, issued to John King. The panel may also be provided with a locking device such as that shown in the King patent. The rear portion of the panel is provided on each side with a bracket 31 which is securely fastened to the panel. Attached to each of the brackets is an axle 32 which projects through the slot 26 of the rear channel member 24. The end of the axle is provided with a holding screw 42. Immediately adjacent to the sides 28 of the channel member 24 are an inside steel disc or washer 34 and an outside steel disc or washer 35. Each of these discs has its outer periphery bevelled on that side of the disc which is to be adjacent to the sides 28 of the channel member 24. The outside steel disc is held in contact with the sides 28 by means of a helical spring 37. The inside steel disc is held against the sides 28 of the channel member by means of helical spring 38. To provide lubrication and to prevent any rattling due to up and down play, a felt oil washer 40 is positioned between the helical spring 38 and the inside steel disc 34.

In operating the panel, the runner positioned at each side of the front of the panel 30, will move along the inwardly directed flange 23 of the front channel members 22, and the two axles 32, positioned at each side of the rear of the panel 30, will move along the slots 26 of the rear channel members 24. When the panel is in the closed position, its rear portion will have been raised substantially in line with the rear roof portion 12 by the ramp formed by the upward curvature of the slots 26 at 27. When the panel is moved backward, the ramp will lower it beneath the rear portion 12 of the vehicle roof.

Because of the construction of the device, any lack of parallelism in the channel members 24 will not cause the sliding panel to bind when it is opened or closed. The helical springs 37 and 38 exert enough pressure against the steel discs 34 and 35 so that they are constantly kept in contact with the sides 28 of the channel members. The pressure of the springs is not so great, however, that the frictional resistance between the discs 34 and 35 and the sides 28 prevents the easy movement of the panel. It will be apparent that any slight convergence or divergence of the pair of channel members will result merely in compressing one or the other of the helical springs 37 or 38, the uncompressed spring expanding sufficiently to take up any slack caused by the compression of the other spring. In this way, the discs 34 and 35 are kept in contact with the sides 28, even though the pair of channel members is not absolutely parallel. Any tendency to rattle due to side play will thus be eliminated.

The simple construction of the device makes it particularly easy to assemble. The helical spring 37, the disc 35, the disc 34, the felt oil washer 40, and the helical spring 38 are slipped over the axle 32 in the order named. The holding screw 42 is then screwed into place and the runner assembly is complete. To position the panel in the channel members 24, it is merely necessary to push the bevelled edges of the discs against the front edge 45 of the channel member. This will cause the helical springs to be forced apart sufficiently to permit the axle 32 to slide into the slot 26. This entire operation may be carried out in a comparatively short period of time. It will, of course, be equally easy to disassemble the device to replace worn parts.

If desired, longitudinal guide members and cooperating runners, such as those shown in application Serial No. 143,896 of John King, may be used to support and guide the front of the sliding panel instead of the front channel members 22. A locking mechanism, such as that shown in the King application, may also be used in connection with the longitudinal guide members, there described, to secure the roof panel at any desired position.

The device which is the subject of this invention may also be used to support and guide the front of the sliding panel. In such case, channel members substantially like rear channel members 24 will be placed along the sides of the roof opening and the sliding panel will be provided at the front with a runner assembly such as that shown in Fig. 4.

I claim:

1. Means for supporting and guiding a sliding roof panel for vehicle bodies comprising a member having a slot, a bearing member supported in said slot, one end of said bearing member being attached to said sliding roof panel, the other end of said bearing member being provided with a collar, resilient means between the attached end of the bearing member and the slotted member, said resilient means tending to force the attached end of the bearing member away from the slotted member, and resilient means between the collar end of the bearing member and the slotted member, said resilient means tending to force the collar end of the bearing member away from the slotted member.

2. Means for supporting and guiding a sliding roof panel for vehicle bodies comprising a member having a slot running longitudinally thereof, an axle supported in said slot, one end of said axle being attached to said sliding roof panel, the other end of said axle being provided with a collar, a pair of discs on said axle, said discs being adjacent to and on opposite sides of said slot, resilient means between one of said discs and the attached end of the axle, said resilient means tending to force the attached end of the axle away from the slotted member, and resilient means between the other of said discs and the collar end of the axle, said resilient means tending to force the collar end of the axle away from the slotted member.

3. Means for supporting and guiding a sliding roof panel for vehicle bodies comprising a member having a slot running longitudinally thereof, an axle supported in said slot, one end of said axle being attached to said sliding roof panel, the other end of said axle being provided with a collar, a pair of discs on said axle, said discs being adjacent to and on opposite sides of said slot, a helical spring under compression surrounding said axle between one of said discs and the attached end of the axle, another helical spring under compression surrounding said axle between the other of said discs and the collar end of the axle.

4. Means for supporting and guiding a sliding roof panel for vehicle bodies comprising a member having a slot running longitudinally thereof, an axle supported in said slot, one end of said axle being attached to said sliding roof panel, the other end of said axle being provided with a collar, a pair of discs on said axle, said discs being adjacent to and on opposite sides of said slot, each of said discs having its outer periphery bevelled on that side of the disc which is adjacent to the sides of the slot, a helical spring under compression surrounding said axle between one of said discs and the attached end of the axle, another helical spring under compression surrounding said axle between the other of said discs and the collar end of the axle.

5. Means for supporting and guiding a sliding roof panel for vehicle bodies comprising a member having a slot running longitudinally thereof, an axle supported by said slot, one end of said axle being attached to said sliding roof panel, the other end of said axle being provided with a collar, a pair of discs on said axle, said discs being adjacent to and on opposite sides of said slot, each of said discs having its outer periphery bevelled on that side of the disc which is adjacent to the sides of the slot, a helical spring under compression surrounding said axle between one of said discs and the attached end of the axle, a felt oil washer on said axle adjacent to the other of said discs, and a helical spring under compression surrounding said axle between the felt oil washer and the collar end of the axle.

RUDOLPH W. CRETEUR.